Oct. 16, 1962     S. C. POLLOCK     3,058,142

VEHICLE HEADLIGHT CLEANING SYSTEM

Filed Sept. 7, 1961     4 Sheets-Sheet 1

INVENTOR.
Samuel C. Pollock
BY
*W. E. Finken*
His Attorney

Oct. 16, 1962     S. C. POLLOCK     3,058,142
VEHICLE HEADLIGHT CLEANING SYSTEM
Filed Sept. 7, 1961     4 Sheets-Sheet 2

INVENTOR.
Samuel C. Pollock
BY
His Attorney

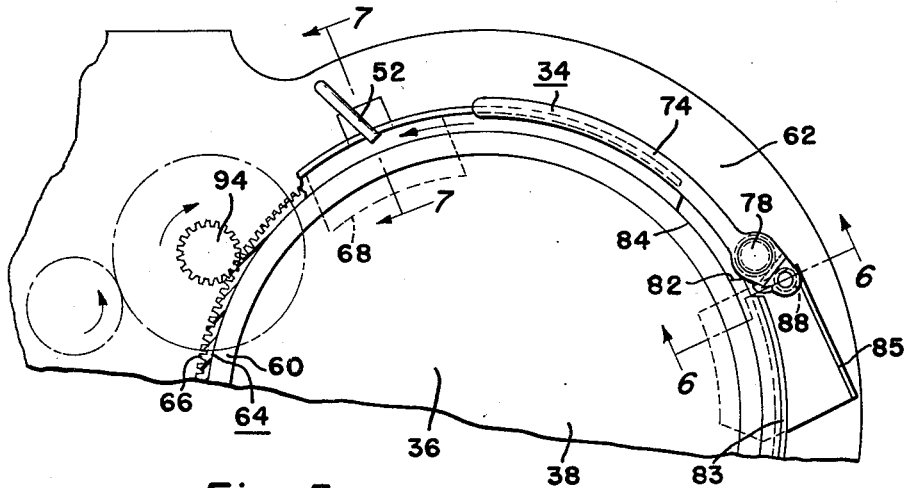
Fig. 5
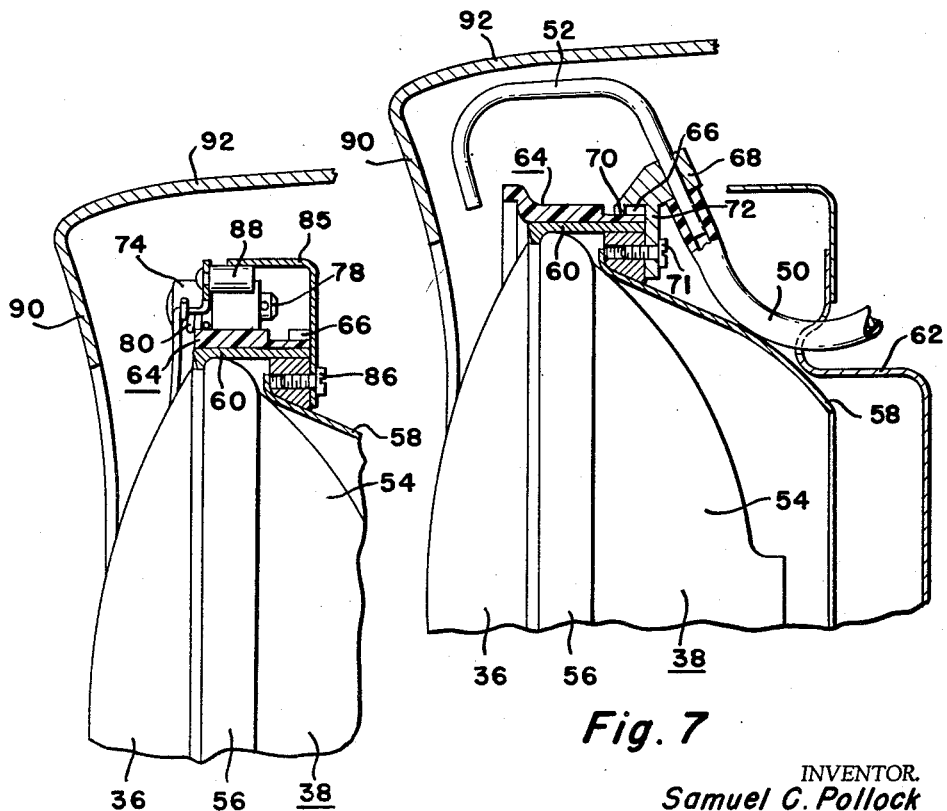
Fig. 6
Fig. 7
INVENTOR.
Samuel C. Pollock
BY
His Attorney Oct. 16, 1962

S. C. POLLOCK 3,058,142

VEHICLE HEADLIGHT CLEANING SYSTEM

Filed Sept. 7, 1961

INVENTOR.
Samuel C. Pollock
BY
W. E. Finden
His Attorney

United States Patent Office 3,058,142
Patented Oct. 16, 1962

3,058,142
VEHICLE HEADLIGHT CLEANING SYSTEM
Samuel C. Pollock, Rochester, Mich., assignor to General Motors Corporation, Detroit, Mich., a corporation of Delaware
Filed Sept. 7, 1961, Ser. No. 136,570
17 Claims. (Cl. 15—250.02)

This invention pertains to a cleaning system for the lenses of vehicle headlights, and particularly to a headlight cleaning system which is coordinated with energization of the headlights and operation of a windshield cleaning system.

The necessities of reducing the hazards of night driving during inclement weather are well recognized by all responsible people. In order to maintain safe vision ahead under inclement weather conditions, most modern vehicles are provided with a windshield cleaning system including a windshield washer unit for spraying solvent onto the windshield into the paths of wiper blades constituting part of the wiper unit so as to maintain a clear field of vision through the windshield at all times. It cannot be doubted that windshield cleaning systems of this type are an important safety feature and substantially reduce the hazards of driving both at night and at day during inclement weather conditions.

However, little, if any attention has been paid in the past to removal of dirt and other road grime from the lenses of the headlights which are used to illuminate the roadway ahead. It is well known that dirt and other road grime which is deposited on the lenses of the headlights during wet or snowy road conditions can appreciably reduce the effective intensity of the headlight beams, thereby substantially reducing the range of roadway illumination. It cannot be questioned that the accumulation of light transmission obscuring material on the lenses of headlights presents a serious night driving hazard.

The present invention is directed in part to a cleaning system for the lenses of headlights including a washer unit for spraying liquid solvent into the lenses of the headlights and simultaneously moving a wiper, in the form of either a squeegee or a brush, across the outer surface of each headlight lens to remove the dirt and other grime therefrom. This headlight cleaning system is preferably designed to be entirely automatic in operation upon manipulation of a control from within the vehicle by the driver so that the washer unit and the wiper unit for the headlights will be concurrently set into operation for a period of conjoint operation, with the washer unit being automatically arrested under the control of a timer while the wiper unit continues in operation for a predetermined period thereafter and is then automatically arrested. Thus, the headlight washer unit and the headlight wiper unit will be concurrently set in operation and sequentially arrested in a manner whereby headlight wiper unit operation is prolonged beyond the period of headlight washer unit operation.

In another aspect the present invention contemplates coordinating operation of the headlight cleaning system with that of the windshield cleaning system during energization of the headlights. More particularly, this aspect of the present invention contemplates a system wherein the headlight cleaning system with be automatically set it to operation when the headlights are illuminated, or energized, and the washer units of the windshield cleaning system are set into operation. Since the headlight cleaning system is entirely automatic in its operation, it will be appreciated that under night time driving conditions the driver can be assured to a maximum range of safe vision ahead by actuating a single manipulative control, namely the windshield washer control, and in this manner initiate a cleaning cycle for both the windshield and the headlights.

Accordingly, among my objects are the provision of a headlight cleaning system including a headlight washer unit and a headlight wiper unit which are operated conjointly and sequentially arrested to prolong headlight wiper unit operation beyond headlight washer unit operation; the further provision of a headlight cleaning system including timer means for automatically arresting operation of the headlight washer unit and the headlight wiper unit; the further provision of a wiper unit for headlight lenses including a wiping element and means for moving the wiping element out of engagement with its respective headlight lens when it is not in use; and the still further provision of a headlight cleaning system including means for coordinating the operation thereof with the operation of a windshield cleaning system and energization of the headlights.

The aforementioned and other objects are accomplished in the present invention by providing a headlight wiper unit and a headlight washer unit on the vehicle in combination with timing means for controlling the interval of operation thereof, and a control system for setting the units in operation either alone, or coordinated with operation of the windshield cleaning system and energization of the headlights. Specifically, the system includes a headlight wiper unit comprising a wiper for each headlight lens which is movable over the surface thereof, the several squeegees being driven by a single motor through an appropriate drive mechanism. The headlight washer unit comprises a nozzle, or nozzle means, associated with each headlight lens for spraying liquid solvent onto the outer surface thereof, which liquid solvent can be supplied by a pump driven by the motor which is used to operate the wipers of the headlight wiper unit. A timer is actuated by the drive mechanism for operating the headlight squeegee unit, which timer constitutes a means for counting revolutions of the squeegees over the headlight lens so as to control conjoint operation of the headlight wiper unit and the headlight washer unit for a predetermined number of revolutions, thereafter automatically arresting the headlight washer unit while continuing operation of the headlight wiper unit, and subsequently arresting the headlight wiper unit.

The wiper for each headlight lens is pivotally mounted on a member rotatable about the periphery of its respective headlight, each wiper being spring biased to a substantially radial position in engagement with its respective headlight lens. The wipers are of elongate arcuate configuration, the chord length being substantially equal to a radial chord of the headlight lens, cam actuated means being provided for pivoting each wiper to a position in alignment with the periphery of its associated headlight at a predetermined angular position thereof during each revolution. The headlight wiper unit is arrested with the wipers disposed along the periphery of the headlight lenses so that the squeegees will not interfere with the transmission of light through the headlight lenses when they are not in operation. Moreover, the wipers and the wiper unit spray nozzles may conveniently be at least partially concealed from view by being disposed beneath the bezels surrounding the headlights when the wipers are in their parked positions along the periphery of their respective headlight lenses.

The control arrangement for the headlight cleaning system comprises a manual control for actuating a switch to initiate a conjoint cycle of headlight washer unit and headlight wiper unit operation at any time. This manually controlled switch is connected in shunt relation with a pair of serially arranged serially connected relay actuated switches which are closed, respectively, when the headlights are energized by completion of the headlight circuit and upon actuation of the control for the windshield washer unit of the windshield cleaning system of the vehicle. Since the vehicle headlights will be energized during night driving, the headlight cleaning system will be coordinated with operation of the windshield cleaning system whenever the control for the windshield washer unit of the windshield cleaning system is actuated.

Further objects and advantages of the present invention will be apparent from the following description, reference being had to the accompanying drawings, wherein like numerals depict like parts throughout the several views, and wherein a preferred embodiment of the present invention is clearly shown.

In the drawings:

FIGURE 5 is a fragmentary view, in elevation, similar to FIGURE 2 with the wiping means in the parked position.

FIGURES 6 and 7 are sectional views taken along lines 6—6 and 7—7 of FIGURE 5.

Figure 8:
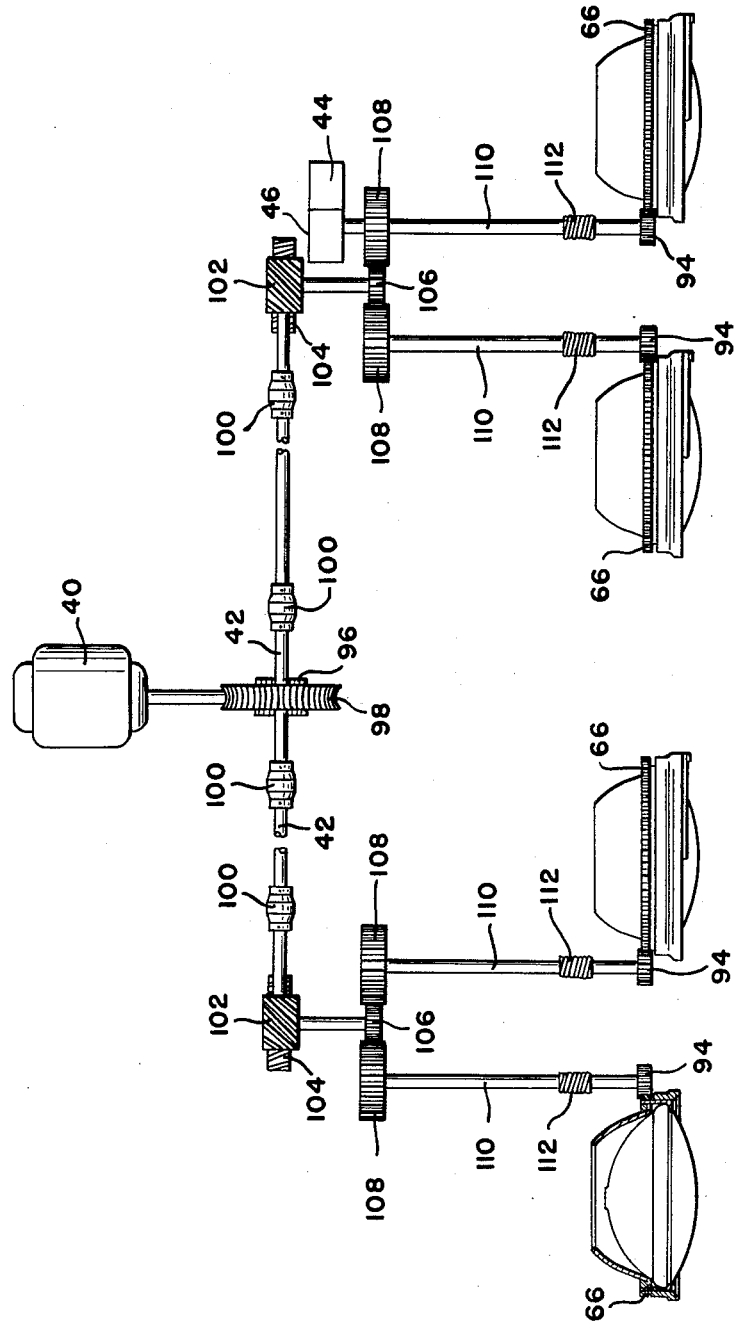

FIGURE 8 is a schematic view of the drive mechanism for the headlight wiper unit, headlight washer unit and timer in a vehicle having four headlights.

Figure 9:
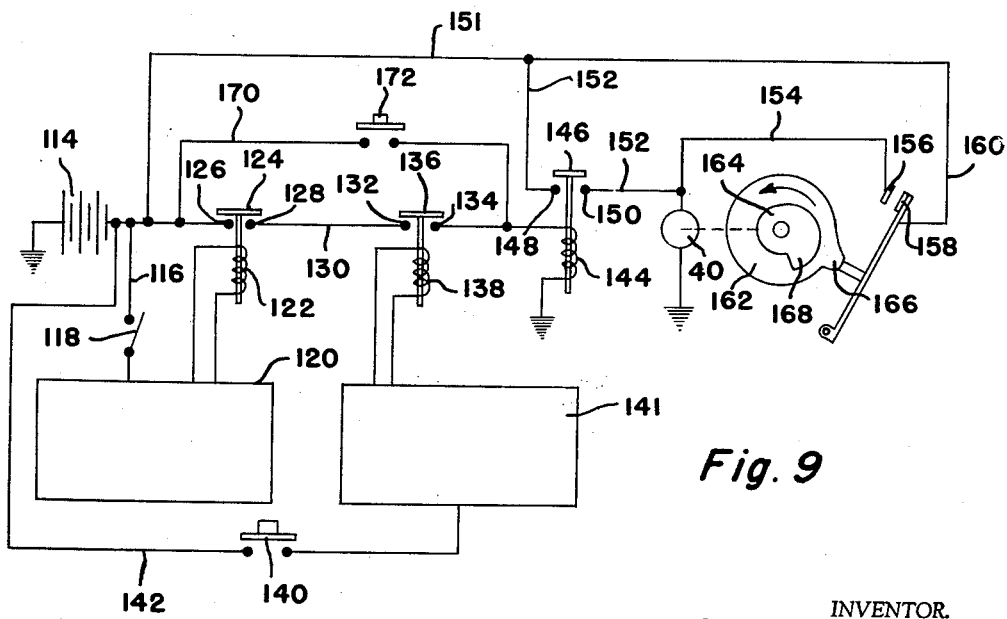

FIGURE 9 is a schematic diagram of the control circuit for the headlight cleaning system of this invention.

Figure 1:
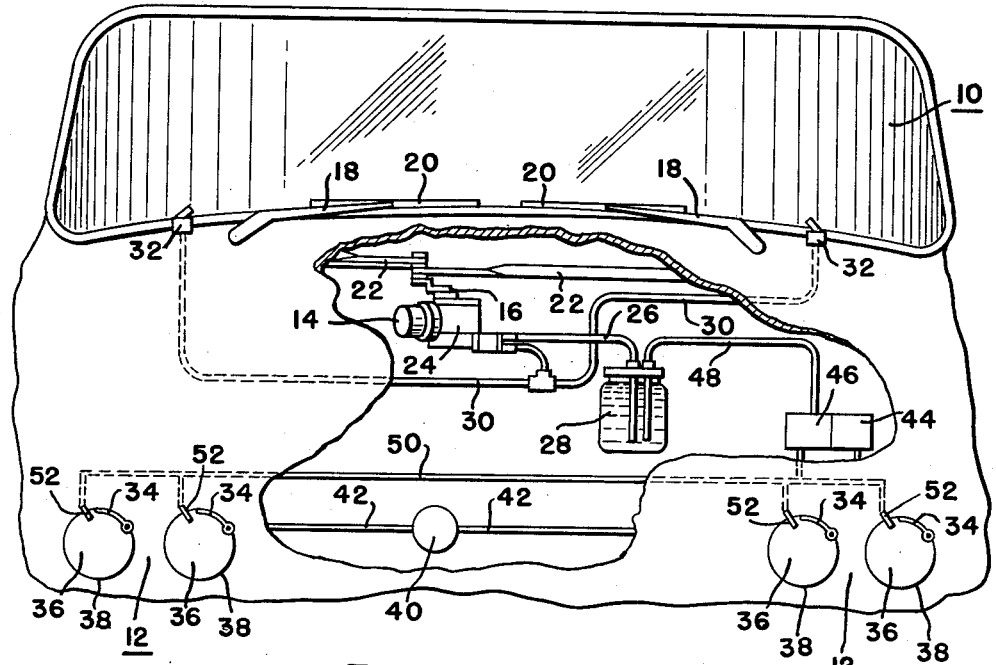
FIGURE 1 is a fragmentary view, partly in section and partly in elevation, of a vehicle equipped with the coordinated headlight cleaning system of this invention.

With particular reference to FIGURE 1, a vehicle is shown having a windshield 10 and dual headlight assemblies 12 located adjacent opposite sides of the vehicle at the front thereof. The vehicle is equipped with a windshield cleaning system comprising a wiper unit including an electric motor 14 for driving a rotary crank assembly 16 which is connected to a pair of spaced wiper arms 18 carrying wiper blades 20 through a drive mechanism including links 22. When the motor 14 of the wiper unit is energized, the wiper arms and blades 20 are simultaneously oscillated in phase opposition across the outer surface of the windshield 10. The windshield cleaning system also includes a washer unit including a pump 24 having an interruptible driving connection with the wiper motor 14 and having an intake conduit 26 connected to a reservoir 28 containing liquid solvent. When the pump 24 of the washer unit is operating, liquid solvent from the reservoir 28 is delivered under pressure through conduits 30 to spaced nozzles 32 for spraying the liquid solvent onto predesignated areas of the windshield into the paths of the moving wiper blades 20. The operation and control of the windshield cleaning system may be of the type shown in Ziegler Patents 2,878,505 and 2,925,618, and accordingly, when the control for the windshield washer unit is actuated, both the windshield washer unit and the windshield wiper unit are set into operation for a period of conjoint operation under the control of a ratchet wheel timer which sequentially arrests the washer unit and the wiper unit in a manner whereby wiper unit operation is prolonged beyond washer unit operation.

In accordance with the present invention, the vehicle is also equipped with a headlight cleaning system comprising a wiper 34 associated with the lens 36 of each headlight 38. The construction and manner of operation of the headlight wipers 34 will be described in detail hereinafter. The headlight wiper unit includes, in addition to the wipers 34, an electric motor 40 connected by a flexible drive linkage 42 through suitable gear mechanism, to be described, with each of the wipers 34 for rotating the same over the outer surfaces of the headlight lenses under the control of a timer 44 such that the headlight wipers will be automatically arrested after a predetermined number of revolutions. The headlight cleaning system also includes a headlight washer unit which may comprise a pump 46 having an intake conduit 48 connected to the liquid solvent reservoir 28 and delivery conduits 50 connected to nozzles 52 for discharging liquid solvent onto the outer surfaces of the headlight lenses and into the paths of movement of the wipers 34. Preferably, the timer 44 is arranged to control operation of the pump 46 and is driven by the headlight wiper motor 40 so as to automatically arrest operation of the headlight washer unit prior to arresting operation of the headlight wiper unit.

With particular reference to FIGURES 2 through 7, each headlight 38 has a partially hemispherical lens 36, a reflector 54, and a mounting rim 56. The headlights 38 are held in assembled relation with mounting ring assemblies 58 by metal retaining rings 60 which circumscribe the headlight rims 56 and are suitable attached to the mounting ring assemblies 58 such as by screws, not shown. Each mounting ring assembly 58 is suitably attached to a bracket assembly 62 which is attached to the vehicle body.

Each annular retaining ring 60 is circumscribed by and has a plastic ring gear assembly 64 journalled on the outer periphery thereof. The ring gear assembly 64 includes a toothed portion 66 and is retained against axial movement relative to the headlight assembly by three circumferentially spaced supports 68 which are attached by screws 71 to the mounting ring assembly 58 and have spaced shoulders, or ribs, 70 and 72 which are arranged on opposite sides of the ring gear teeth 66 as shown in FIGURE 7. One of the supports 68, as shown in FIGURE 7, carries a nozzle 52 for spraying liquid solvent onto the lens 36 of its associated headlight.

Figure 2:
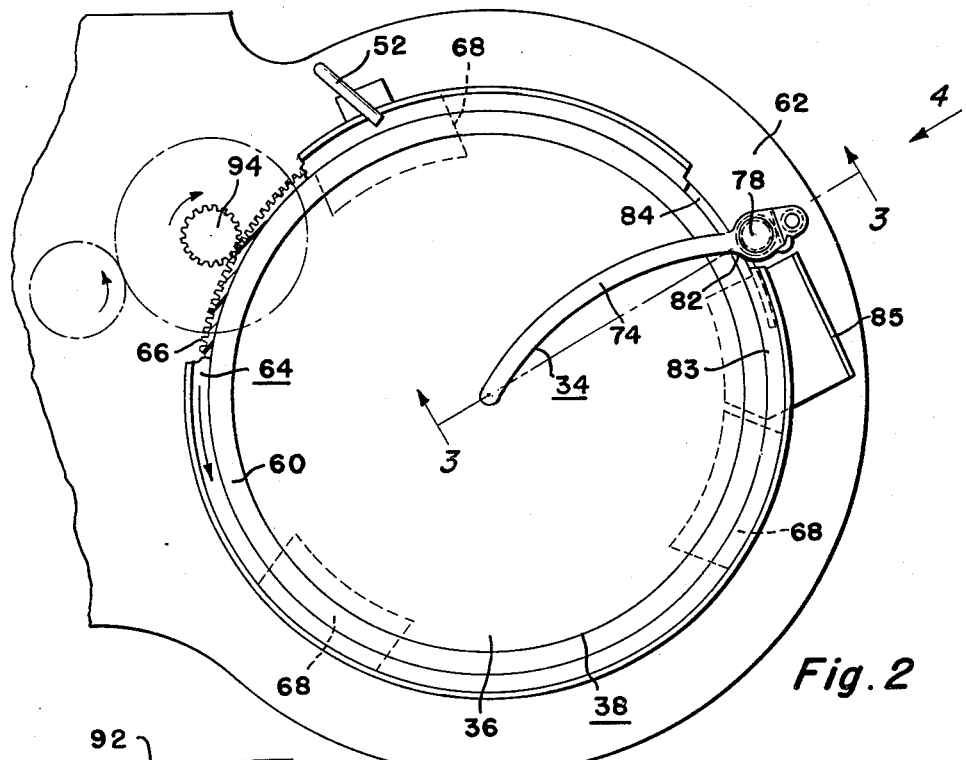
FIGURE 2 is an enlarged fragmentary view, in elevation, of a headlight including washing and wiping means constructed according to the present invention, with the bezel removed and with certain parts broken away.
Figures 3, 4:
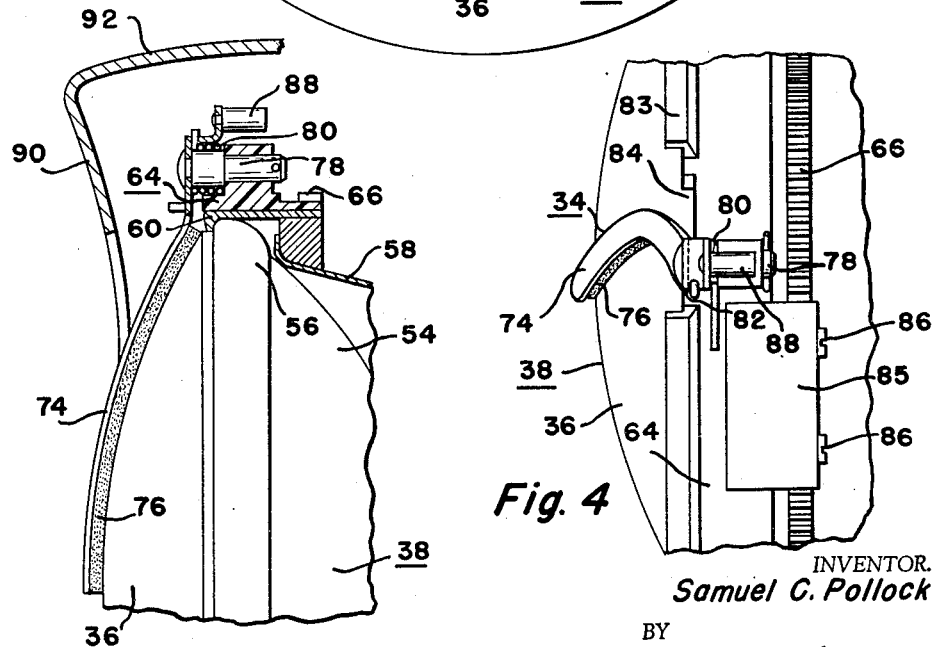
FIGURE 3 is a sectional view taken along line 3—3 of FIGURE 2.
FIGURE 4 is a fragmentary view, in elevation, taken in the direction of arrow 4 of FIGURE 2.

The wipers 34 may conveniently comprise a resiliently flexible spring metal backing 74 which carries a rubber or brush type wiping element 76. As seen particularly in FIGURES 2 and 5, the spring metal backs 74 are of arcuate configuration and generally conform to the curvature of the headlight rim when they are in the parked positions as indicated in FIGURE 5. The spring metal back of each wiper 34 is rigidly attached to a stub shaft 78 journalled in a projection on the ring gear assembly 64. A portion of the stub shaft 78 is encircled by a torsion spring 80, one end of which extends through an opening in the spring metal back 74 and the other end of which engages the ring gear assembly 64 as shown in FIGURE 4, the torsion spring 80 acting to bias the wiper 34 to a generally radial position as shown in FIGURE 2 whereat the spring metal back engages an abutment 82 integral with the ring gear assembly 64. A forwardly projecting flange 83 integral with the ring gear 64 has an arcuate cutout 84 permitting pivotal movement of the wiper 34.

A stationary cam plate 85 is attached to the mounting ring assembly 58 by screws 86 and is adapted to coact with a roller type follower 88 attached to the end of the spring metal back 74 of each wiper 34. At a predetermined angular position of the ring gear 64, and hence the wiper 34, the stationary cam plate 85 will engage the roller 88 as shown in FIGURES 5 and 6 and thus effect pivotal movement of the wiper 34 to a peripheral parked position against the flange 83 whereat it is disengaged from the headlight lens. The nozzle 52 and the wiper 34 may be at least partially concealed from view when the wiper 34 is in the parked position by the overhanging lip 90 of the ornamental headlight bezel 92 as shown in FIGURES 6 and 7.

The ring gear 66 is engaged by a pinion gear 94 driven by the headlight wiper motor in a manner to be described hereinafter. When the pinion gear 94 is driven in the clockwise direction as seen in FIGURE 5, the ring gear 66 and the ring gear assembly 64 is driven in the counterclockwise direction thereby disengaging the follower 88 from the cam 85 and allowing the torsion spring 80 to pivot the wiper 34 to the position of FIGURE 2. As the ring gear assembly 64 rotates about the headlight, the wiper 34 will wipe the outer surface of the headlight lens, and as it approaches the end of each revolution the follower roller 88 will be engaged by the stationary cam plate 85 so as to return the wipers to their parked positions during each revolution. If rotation of the ring gear 64 is arrested at this time, the wipers 34 will remain in their parked positions.

With reference to FIGURE 8, the drive mechanism for the four headlight wipers comprises the unidirectional electric motor 40 connected through a worm 96 and worm gear 98 to drive shafts 42 extending in opposite directions. The drive shafts may include flexible couplings 100 which accommodate angular displacement of the several shaft sections. The shafts 42 are connected through helical gears 102 and 104 to spur gears 106, each of which meshes with a pair of gears 108. The gears 108 are connected to shafts 110 having coil spring type flexible couplings 112 which permit headlight aiming adjustments. The pinion gears 94 are driven by the shafts 110 through the flexible couplings 112.

The timer 44 and pump assembly 46 may be driven from one of the gears 108, the timer 44 controlling the number of revolutions of the wiper during each cycle of operation and also controlling the number of revolutions of each wiper during which the pump 46 is operated to deliver liquid solvent to the nozzles 52. The combined timer and pump assembly can conveniently take the form of a washer pump and timer as shown in the aforementioned Ziegler patents. This timer may, for example, continue operation of the washer unit for three revolutions of the wiper unit, arrest the washer unit, continue operation of the wiper unit for one additional revolution and then arrest the wiper unit.

With reference to FIGURE 9, the control arrangement for the headlight cleaning system of this invention will be described. The control arrangement includes the vehicle battery 114 having a wire 116 connected with a switch 118 for controlling the headlight energizing circuit 120. Whenever the headlights are energized by closure of the switch 118 a relay coil 122 is concurrently energized for moving a bridging contact 124 into engagement with spaced stationary contacts 126 and 128 connected in series with a wire 130. A second set of stationary contacts 132 and 134 are serially connected with the wire 130 and can be bridged by a movable contact 136 upon energization of relay coil 138. The relay coil 138 will be momentarily energized when the push button switch 140, which controls the energizing circuit 141 for initiating operation of the windshield wiper unit and the windshield washer unit, is actuated. The push button switch 140 is connected by a wire 142 with the battery 114.

The wire 130 is connected to a relay coil 144, such that when both switches 124 and 136 are closed, the relay coil 144 will be energized. Relay coil 144 actuates a bridging contact 146 for completing a circuit between stationary contacts 148 and 150 leading from the battery 114 to the motor 40 through wires 151 and 152. The motor 40 is also connected to a wire 154 through a cam actuated switch including a stationary contact 156 and a movable contact 158 connected to a wire 160 which is joined to the wire 151 on the battery side of the switch 146. Momentary energization of relay coil 144 is sufficient to initiate energization of the motor 40 which drives the cams 162 and 164 of the timer 44. The cam 162 has a single rise 166 such that initial movement of the cam 162 will result in closure of switch contacts 156 and 158 so as to energize the motor 40 through wires 151, 160 and 154. The motor will continue to be energized until the cam 162 completes one revolution whereat the contacts 156 and 158 will be opened.

The cam 164, driven in unison with cam 162, may be used to control the operation of a pump in a manner similar to that set forth in the aforementioned Ziegler patent, which pump forms a component of the headlight washer unit. Accordingly, this cam 164 has a rise 168 which subtends an angle of substantially 90° so that operation of the headlight washer pump will be arrested prior to operation of the headlight washer unit.

The serially connected switches 124 and 136 are shunted by a wire 170 containing a push button switch 172, the switch 172 constituting the manual control for initiating a conjoint cycle of headlight washer and wiper unit operation independently of the coordinating control means comprising switches 124 and 136. Thus, the vehicle operator can clean the headlight lenses at any time by momentarily depressing the push button switch 172 thereby momentarily closing the relay operated switch 146 to initiate a cycle of operation of the headlight cleaning system. In addition, the headlight cleaning system is automatically coordinated with operation of the windshield cleaning system when the headlights are energized. Thus, it can be seen that when driving at night with the headlights energized, the switch 136 will be closed so that whenever the windshield cleaning system is set into operation by manipulation of the manual control 140, the headlight cleaning system will concurrently be set in operation.

While the embodiment of the invention as herein disclosed constitutes a preferred form, it is to be understood that other forms might be adopted.

What is claimed is as follows:

1. In a vehicle, a windshield cleaning system including a windshield washer unit and a windshield wiper unit, a plurality of headlights, a headlight cleaning system including a headlight washer unit and a headlight wiper unit, manual controls for initiating operation of said windshield cleaning system and energizing said headlights, control means for setting said headlight cleaning system in operation, and means automatically actuating said control means to set said headlight cleaning system in operation when the windshield cleaning system control and headlight energizing control are actuated so as to effect conjoint operation of said headlight cleaning system and the windshield cleaning system.

2. In a vehicle, a windshield cleaning system including a windshield wiper unit and a windshield washer unit, a plurality of headlights, a headlight cleaning system including a headlight washer unit and a headlight wiper unit, manual controls for initiating operation of said windshield cleaning system and energizing said headlights, and coordinating control means operable to automatically initiate operation of said headlight cleaning system when the headlights are energized and the windshield cleaning system is set into operation.

3. In a vehicle, a windshield cleaning system including a windshield washer unit and a windshield wiper unit, a plurality of headlights, a headlight cleaning system including a headlight washer unit and a headlight wiper unit, manual controls for selectively initiating independent operation of the windshield cleaning system, the headlight cleaning system and energizing said headlights, and coordinating control means operable to automatically initiate operation of said headlight cleaning system when the headlights are energized and the windshield cleaning system is set into operation.

4. In a vehicle, a windshield cleaning system, a plurality of headlights, a headlight cleaning system, power means for operating said headlight cleaning system, a manual control for initiating operation of said headlight cleaning system, and coordinating control means operable to automatically initiate operation of said headlight cleaning system when the headlights are energized and the windshield cleaning system is set in operation.

5. In a vehicle, a windshield cleaning system, a plurality of headlights, a headlight cleaning system, power means for operating said headlight cleaning system, and coordinated control means operable to automatically initiate operation of said headlight cleaning system upon initiating operation of said windshield cleaning system when the headlights are energized.

6. A headlight cleaning system for a vehicle including, a headlight washer unit including liquid solvent spraying means, a headlight wiper unit including power operated rotatable wiper means, means to set both units in operation for conjoint operation, and timer means operable during said conjoint operation for automatically arresting operation of said washer unit during continued operation of said wiper unit.

7. A headlight cleaning system for a vehicle including, a headlight washer unit including liquid solvent spraying means, a headlight wiper unit including rotatable wiper means, electrical means for conjointly actuating said liquid solvent spraying means said rotatable wiper means, and timer means operable during said conjoint operation for automatically arresting said two units in a sequential order that prolongs wiper unit operation beyond washer unit operation.

8. A headlight wiper system including, a headlight having a lens and a mounting rim, an annular retainer coupled to said mounting rim, a drive ring journalled on said retainer, a wiper pivotally attached to said drive ring, drive means for rotating said drive ring about said annular retainer, means operable to effect pivotal movement of said wiper to a position where said wiper is out of engagement with said headlight lens at a predetermined angular position of said drive ring, and means operatively associated with said wiper for effecting pivotal movement thereof into engagement with said headlight lens upon rotation of said drive ring away from said predetermined angular position.

9. A headlight wiper system, including a headlight having a lens and a mounting rim, an annular retainer coupled to said mounting rim, a ring gear assembly journalled on said retainer, a wiper pivotally attached to said gear assembly, drive means for rotating said ring gear assembly about said annular retainer, cam actuated means for effecting pivotal movement of said wiper out of engagement with said headlight lens at a predetermined angular position of said ring gear assembly, and means operatively associated with said wiper for effecting pivotal movement thereof into engagement with said headlight lens upon rotation of said ring gear assembly away from said predetermined angular position.

10. A headlight wiper system including, a headlight having a lens and a mounting rim, an annular retainer coupled to said mounting rim, a ring gear assembly journalled on said retainer, a wiper pivotally attached to said ring gear assembly, drive means for rotating said ring gear assembly, cam actuating means for effecting pivotal movement of said wiper out of engagement with said headlight lens at a predetermined angular position of said ring gear assembly, and torsion spring means operatively associated with said wiper for pivoting said wiper into engagement with said headlight lens upon rotation of said ring gear assembly away from said predetermined angular position.

11. A headlight wiper system including, a headlight having a lens and a mounting rim, a mounting ring assembly for supporting said headlight, an annular retainer attached to said mounting ring assembly and coupled with said mounting ring for supporting said headlight within said mounting ring assembly, a ring gear assembly journalled on said retainer and having a forwardly projecting flange with an arcuate cutout therein, a wiper pivotally mounted on said ring gear assembly in alignment with the arcuate cutout in said forwardly projecting flange, drive means connected to said ring gear assembly for rotating said ring gear assembly relative to said annular retainer, stationary cam means carried by said mounting ring assembly and coacting with said wiper at a predetermined angular position of said ring gear assembly for pivoting said wiper blade out of engagement with said headlight lens and into engagement with said projecting flange, and torsion spring means operatively associated with said wiper and reacting between said wiper and said ring gear assembly for automatically effecting pivotal movement of said wiper into engagement with said headlight lens upon rotation of said ring gear assembly away from said predetermined angular position.

12. The combination set forth in claim 11 wherein said stationary cam comprises a plate, and wherein said wiper includes a cam follower engageable with said plate at said predetermined angular position of said ring gear assembly for automatically effecting pivotal movement of said wiper into engagement with said projecting flange.

13. In combination with a headlight system in a motor vehicle including a manual control for energizing the headlight system and a windshield cleaning system for said vehicle including a control for initiating operation of said windshild cleaning system, a headlight cleaning system including wiper means, and coordinating control means operable to automatically initiate operation of said headlight cleaning system when the headlights are energized and the windshield cleaning system is set into operation.

14. In combination with a headlight system in a motor vehicle including a manual control for energizing said headlight system and a windshield cleaning system for said vehicle including a manual control for initiating operation of said windshield cleaning system, a headlight cleaning system including headlight washer means, and coordinating control means operable to automatically initiate operation of said headlight cleaning system when the headlights are energized and the windshield cleaning system is set in operation.

15. In a vehicle having a windshield and a plurality of headlights, a windshield cleaning system, a headlight cleaning system, manual controls for initiating operation of the windshield cleaning system and energizing said headlights, and coordinated control means operable to automatically initiate operation of said headlight cleaning system when the headlights are energized and the windshield cleaning system is set in operation.

16. In a vehicle having a windshield and a plurality of headlights, a windshield cleaning system, a headlight cleaning system, manual controls for initiating operation of said windshield cleaning system and energizing said headlights, coordinating control means operable to automatically initiate operation of said headlight cleaning system when the headlights are energized and the windshield cleaning system is set into operation, and timer means operable to automatically arrest operation of said headlight cleaning system.

17. In a vehicle having a windshield and a plurality of headlights, a windshield cleaning system, a headlight cleaning system, manual controls for selectively initiating independent operation of the windshield cleaning system, the headlight cleaning system and energizing said headlights, and coordinating control means operable to automatically initiate operation of said headlight cleaning system when the headlights are energized and the windshield cleaning system is set in operation.

References Cited in the file of this patent

UNITED STATES PATENTS

| 2,749,568 | Bird et al. | June 12, 1956 |
| 2,878,505 | Ziegler | Mar. 24, 1959 |